(12) United States Patent
Stephenson

(10) Patent No.: US 6,343,412 B1
(45) Date of Patent: Feb. 5, 2002

(54) SEALING A CLEARANCE BETWEEN A HOST PIPE AND A LINEAR PIPE

(75) Inventor: Adam John Stephenson, Horsforth (GB)

(73) Assignee: Transco plc, London (GB)

( * ) Notice: Subject to any disclaimer, the term of this patent is extended or adjusted under 35 U.S.C. 154(b) by 0 days.

(21) Appl. No.: 09/147,606

(22) PCT Filed: Jul. 30, 1997

(86) PCT No.: PCT/GB97/02048

§ 371 Date: Mar. 17, 1999

§ 102(e) Date: Mar. 17, 1999

(87) PCT Pub. No.: WO98/05899

PCT Pub. Date: Feb. 12, 1998

(30) Foreign Application Priority Data

Aug. 1, 1996 (GB) ............................................. 9616252

(51) Int. Cl.[7] ................................................. B23P 25/00
(52) U.S. Cl. ........................... 29/458; 29/235; 405/184; 138/98; 277/615
(58) Field of Search ................................ 138/137, 138, 138/114, 98; 285/55; 29/235, 450, 458; 277/615; 405/184

(56) References Cited

U.S. PATENT DOCUMENTS

| | | | | |
|---|---|---|---|---|
| 3,298,716 A | * | 1/1967 | Taylor | .......................... 285/55 |
| 4,194,750 A | * | 3/1980 | Sovish et al. | |
| 4,293,138 A | * | 10/1981 | Swantee | .................. 277/207 A |
| 4,346,922 A | * | 8/1982 | Ohtsuga et al. | |
| 4,394,202 A | * | 7/1983 | Thomas et al. | ................. 29/235 |
| 4,410,391 A | * | 10/1983 | Thomas et al. | ................ 138/98 |
| 5,079,837 A | * | 1/1992 | Vanselow | ...................... 138/97 |
| 5,482,076 A | * | 1/1996 | Taylor et al. | ................... 138/97 |
| 5,497,807 A | * | 3/1996 | Rogers | ......................... 138/98 |
| 5,853,204 A | * | 12/1998 | Bartholomew | |
| 6,024,515 A | * | 2/2000 | Konwinski et al. | ............ 138/98 |

* cited by examiner

Primary Examiner—P. W. Echols
Assistant Examiner—Steven Blount
(74) Attorney, Agent, or Firm—Oblon, Spivak, McClelland, Maier & Neustadt, P.C.

(57) ABSTRACT

An apparatus for sealing a clearance between a host pipe and a liner pipe. The liner pipe is fed into the host pipe and includes a tubular element forming a leading end of the liner pipe. It also includes a compressible seal which is adapted when compressed longitudinally to expand radially and is mounted on the tubular element when in use. The seal moves freely with the element in the direction of feeding of the liner pipe. But when the liner pipe is retracted counter to the direction of feeding, the seal movement is arrested and the seal compressed longitudinally by the element so that the seal expands radially to engage the internal wall of the host pipe and seal the clearance.

24 Claims, 2 Drawing Sheets

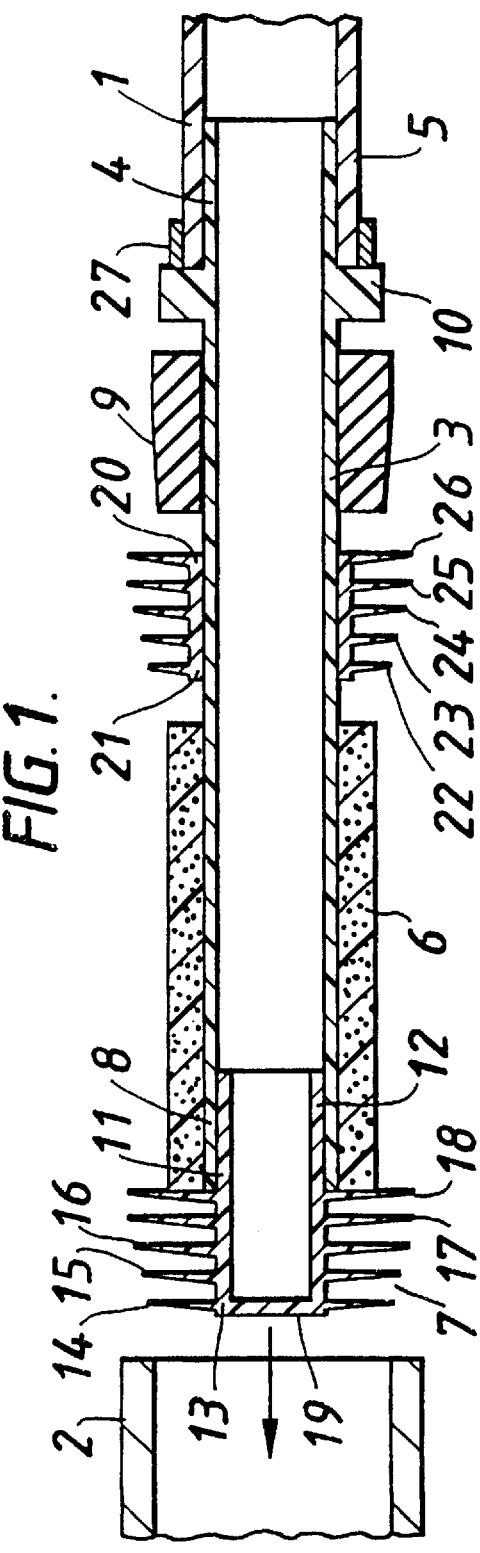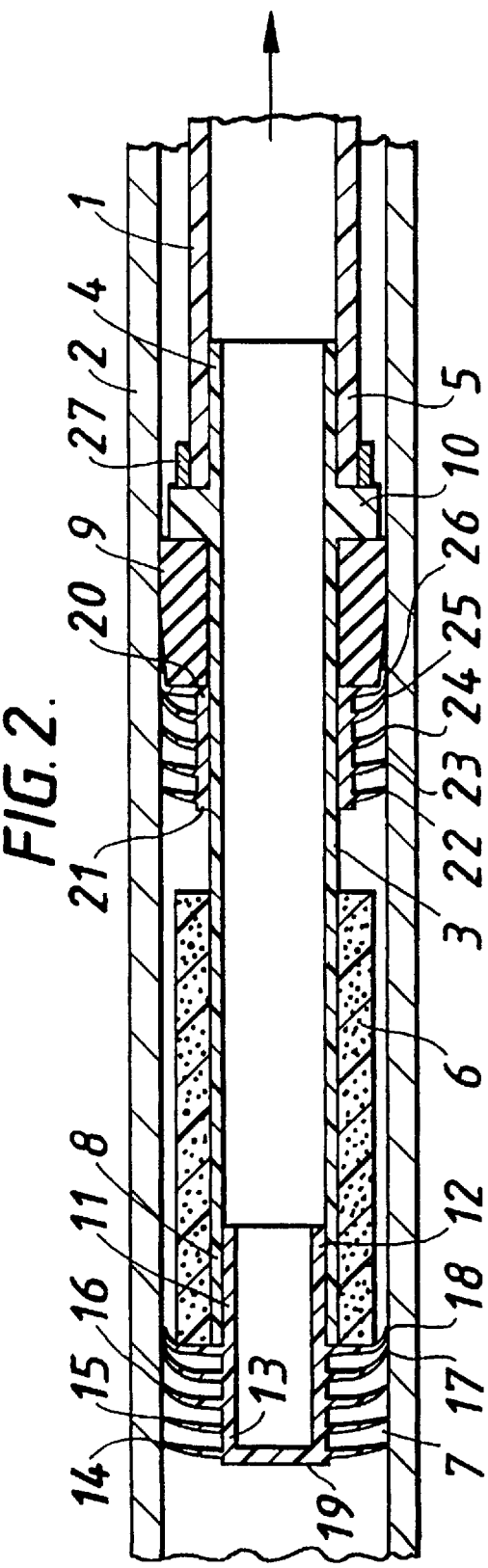

SEALING A CLEARANCE BETWEEN A HOST PIPE AND A LINEAR PIPE

BACKGROUND OF THE INVENTION

1. Field of the Invention

The present invention relates to the sealing of a clearance between a host pipe and a liner pipe.

2. Discussion of the Background

It is known to line host pipes with liner pipes to replace or repair the host pipe because the host pipe is already defective in some way or may become defective and fluid may be leaking from it or be about to leak from it.

Where the host pipe is a gas carrying service pipe supplying gas from an external main to a building such as a dwelling, the liner pipe is normally of plastic eg polyethylene and the service pipe of steel.

To replace the service pipe, the liner pipe is fed into a downstream (in the sense of the direction of gas flow) end of the service pipe into and then along the service pipe until the desired length of service pipe has been replaced. To permit the easy passage of the liner pipe into and along the service pipe the external diameter of the liner pipe and the internal diameter of the service pipe are chosen so that there is a clearance between the pipes.

A so-called "nose-cone" is connected to the leading end of the liner pipe before it is fed into the service pipe. This is a tubular member of the plastics material which in use, may be adhered to or force fitted onto the leading end of the liner pipe. The nose-cone is provided with at least one vane or fin radially directed outwardly from the body of the member. The vane or vanes are flexible and, in use, engage the internal wall of host pipe to provide a seal or barrier to the flow of gas along the clearance from the upstream to the downstream end of the clearance both while the liner pipe is being fed into the host pipe as well as after the feeding step has been completed.

The nose-cone is also provided with a frangible means to block the bore of the nose-cone while it and the liner pipe are being fed into and along the service pipe. This temporarily prevents gas entering the liner pipe.

The frangible means may take the form of a frangible membrane or a push-out or pop-out stopper or plug. When the liner pipe is in place the membrane is ruptured and/or removed or the stopper pushed out to permit gas to enter the liner pipe.

Then a sealant is introduced into the clearance to form a further seal in the clearance. The sealant may be a two-part anaerobic sealant which while fluid is injected into the clearance and then sets or hardens after a delay.

A full description of a typical service pipe replacement technique is described in UK Published Patent Application No. 2227071A together with a typical nose-cone.

Another method and nose-cone is described in UK Published Patent Application No. 2275901A.

The sealant used in the two documents referred to above is relatively expensive and a significant amount of it must be used to ensure a gas-tight seal.

SUMMARY OF THE INVENTION

It is therefore an object of the present invention to seal the clearance between a host pipe and a liner pipe in a less expensive manner than is described in the above documents.

According to one aspect of the present invention, there is provided apparatus for sealing a clearance between a host pipe and a liner pipe which, in use, is fed into the host pipe, the apparatus comprising a tubular element for connection to or forming a leading end of the liner pipe and a compressible seal which is adapted when compressed longitudinally to expand radially and which, in use, is mounted on the element, the arrangement being such that the seal moves freely with the element in the direction of feeding of the liner pipe but when the liner pipe is retracted counter to the direction of feeding further seal movement is arrested and the seal is compressed longitudinally by the element so that the seal expands radially to engage the internal wall of the host pipe and seal the clearance.

According to another aspect of the present invention, there is provided a method for sealing a clearance between a host pipe and a liner pipe which, in use, is fed into the host pipe, the method comprising, after the liner pipe has been fed into the host pipe, causing a compressible seal mounted on a leading end of the liner pipe to be compressed longitudinally so that the seal expands radially to engage the internal wall of the host pipe and seal the clearance.

Preferably the seal is annular in shape.

The seal may be porous and may also be in the form of a sponge possibly of foam plastic or the like.

A sealant is suitably provided in liquid form for application to the seal, the sealant, in use, on being applied to the seal permeating the pores of the seal before the seal is fed into the host pipe and then setting after a time which allows the seal to be fed into the host pipe, compressed and expanded radially into engagement with the internal wall of the host pipe.

The sealant maybe a two part sealant conveniently of the anaerobic kind which sets some time after the components have been mixed, the time of setting being variable dependent on the initial proportion of the components.

Preferably the tubular element is provided with first and second stop means between which, in use, the seal is compressed.

The first of the stop means is suitably located forwardly of the second stop means which is slidably mounted on the element and is adapted, in use, to move with the element in the direction of feeding of the liner pipe but is also adapted to grip the internal wall of the host pipe and remain stationary during the rearward movement of the liner pipe when this is retracted so that the seal is compressed between the two stop means.

Conveniently the first stop means is a nose-cone for connection to the leading end of the tubular element.

The nose-cone may be similar to any of those referred to in the introduction.

BRIEF DESCRIPTION OF THE DRAWINGS

An embodiment of the invention will now be particularly described with reference to the accompanying drawings in which:

FIGS. 1 to 3 are longitudinal sections through the host pipe and liner pipes and the sealing apparatus at various stages of the sealing method.

DETAILED DESCRIPTION OF THE PREFERRED EMBODIMENTS

Figure 3:
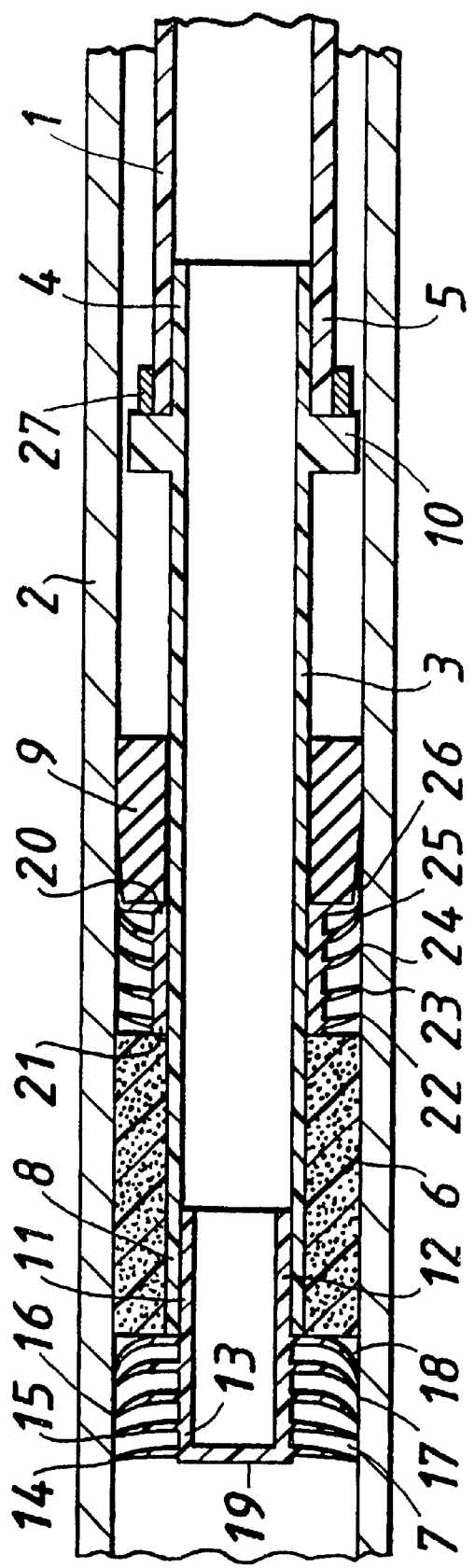

Referring to FIG. 1 which is the position immediately before the liner pipe 1 is inserted into the host pipe, in this case a gas service pipe 2, the sealing apparatus comprises a tubular element 3 which in use, is connected at its rear end 4 to the leading end 5 of the liner pipe 1, a compressible annular seal 6 which fits over the element 3, a nose-cone 7 fitted to the leading end 8 of the element 3 and an annular stop means or member 9 also fitting over the element 3 and lying between the liner pipe 1 and the service pipe 2.

The tubular element 3 is a plastics tube of, say, polyethylene. It is or may be a moulding produced with an annular flange 10 acting as a stop means or stop member adjacent its rear end for purposes to be described.

The annular seal 6 is of a compressible porous material such as a foamed plastic. It is dimensioned to form a close fit over the tube 3.

The nose-cone 7 is of conventional design and comprises a moulded polyethylene stub tube 11 the rear end 12 of which is dimensioned to form a close fit in the bore of the tube 3. Circumventing the outer wall of the front end 13 of the nose-cone 7 are five annular vanes or fins 14 to 18, the diameter of the vanes increasing in a direction away from the nose-cone 7. The front end 13 of the nose-cone 7 is closed by a removable plug or puncturable membrane 19 to temporarily block the bore of the liner pipe 1 to the flow of gas.

The annular stop member 9 is of a resilient material eg rubber and is a slide fit on the tube 3. Its purpose will also be described subsequently.

Also located as a slide fit on the tube 3 is a further stop means or member 20, comprising a moulded polyethylene stub tube 21 circumventing the outer wall of which are five annular vanes or fins 22 to 26, the diameter of the vanes increasing in a direction away from the nose-cone 7. Once again the purpose of the stop means 20 will be described subsequently.

To assemble the apparatus, firstly the rear end 4 of the tube 3 is fitted into the leading end 5 of the liner pipe 1 which end 5 engages the stop member 10. Then a clamping ring 27 is threaded over the liner pipe 1 until this ring 27 too engages the stop 10, the ring 27 being dimensioned to compress the liner pipe 1 against the tube 3 and provide a secure connection therebetween.

Next, the stop member 9 is fitted over the leading end 8 of the tube 3 and is slid along the liner pipe 1 towards the stop member 10. Then the stop member 20 is fitted over the leading end 8 of the tube 3 and is slid along the tube 3 towards the stop member 9.

Following this stop, the annular seal 6 is fitted over the leading end 8 of the tube 3 and is slid along the tube 3 towards the stop member 20.

Finally the rear end 12 of the nose-cone 7 is fitted into the bore of the tube 3 at its leading end 8. The outer wall of the rear end 12 of the nose-cone 7 is coated with a strong adhesive such as an anaerobic glue to ensure the nose-cone 7 is securely attached to the tube 3.

Just before the sealing apparatus in inserted into the service pipe 2, a two part liquid hardenable sealant mix such as a two part anaerobic sealant mix is applied to the annular seal 6 in such a way that the seal 6 is completely saturated in the sealant.

The assembly of the liner pipe 1 and sealing apparatus is then inserted into the service pipe 2 as shown in FIG. 2. The assembly may be pushed through a gland (not shown) connected to the service pipe 2 until the nose-cone 7 enters the external main (not shown) and is then retracted back into the service pipe 2 in the well known manner.

At this point (FIG. 3) the stop members 9 and 20 lock in position in the service pipe 2 by gripping the internal wall of the pipe 2 while the liner pipe 1 itself, the annular seal 6 and the nose-cone 7 continue to move rearwardly to compress the seal 6 between the nose-cone 7 and the stop member 20 to cause the seal to expand radially into engagement with the internal wall of the service pipe 2.

The stop member 20 also acts as a barrier to the sealant in the seal 6 so as not to allow sealant from the seal 6 to contaminate the stop member 9 whereby members 20 and 9 slip or slide thereby reducing the compression of member 6 resulting in a potential leakage track.

The apparatus is left in position at this point until the sealant has cured and the apparatus is now firmly secured to the inner wall of the service pipe 2 to seal the clearance between the pipes 1 and 2.

A rod (not shown) is passed along the bore of the pipe 1 as is well known to engage and cause the plug to pop out or to pierce or puncture the membrane to permit gas to flow into the liner pipe 1.

What is claimed is:

1. Apparatus for sealing a clearance between a host pipe and a liner pipe which is fed into the host pipe, the apparatus comprising a tubular element located at a leading end of the liner pipe and a compressible seal located longitudinally adjacent to said tubular element adapted to expand radially when compressed longitudinally and which is mounted on the element, the seal being mounted on the element and freely movable with the element in a direction of feeding of the liner pipe and wherein when the liner pipe is retracted counter to the direction of feeding further seal movement is arrested and the seal is compressed longitudinally by the element so that the seal expands radially to engage an internal wall of the host pipe and seal the clearance.

2. Apparatus as claimed in claim 1 in which the seal is annular.

3. Apparatus as claimed in claim 4, in which there is provided a sealant which is applied in liquid form to the seal so that the liquid permeates the pores of the seal before the seal is fed into the host pipe and then the sealant sets after a time which allows the seal to be fed into the host pipe, compressed and expanded radially into engagement with the internal wall of the host pipe.

4. Apparatus as claimed in claim 1 in which the seal is porous.

5. Apparatus as claimed in claim 1 in which the seal is a sponge.

6. Apparatus as claimed in claim 5, in which there is provided a sealant which is applied in liquid form to the seal so that the liquid permeates the pores of the seal before the seal is fed into the host pipe and then the sealant sets after a time which allows the seal to be fed into the host pipe, compressed and expanded radially into engagement with the internal wall of the host pipe.

7. Apparatus as claimed in claim 1 in which the element is provided with first and second stop means between which, in use, the seal is compressed.

8. Apparatus as claimed in claim 7 in which the first stop means is located closer to the leading end of the liner pipe than the second stop means, the second stop means being slidably mounted on the element and adapted, in use, to move with the element in the direction of feeding of the liner pipe but to grip the internal wall of the host pipe and remain stationary during the rearward movement of the liner pipe when the liner pipe is retracted so that the seal is compressed between the two stop means.

9. Apparatus as claimed in claim 8 in which the second stop means is a resilient annular stopper.

10. Apparatus as claimed in claim 7 in which the first stop means is a nose-cone for connection to the leading end of the tubular element.

11. Apparatus as claimed in claim 7 in which the element is provided with a third stop means located further from the leading end of the liner pipe than the second stop means to engage the second stop means so as to ensure forward movement of the second stop means with the liner pipe during the feeding step.

12. Apparatus as claimed in 7 in which the element is provided with a further annular member for slidably mounting on the element between the seal and the second stop means, the member having at least one radially directed flexible fin for engagement with the internal wall of the host pipe.

13. A method for sealing a clearance between a host pipe and a liner pipe which, in use, is fed into the host pipe, the method comprising feeding the liner pipe into the host pipe and retracting the liner pipe counter to the direction of feeding thereby arresting further movement of a compressible seal mounted on a tubular element located at a leading end of said liner pipe, said compressible seal being adapted to expand radially when compressed longitudinally by said tubular element thereby engaging an internal wall of the host pipe and seal the clearance.

14. A method as claimed in claim 13 in which the seal is annular.

15. A method as claimed in claim 14 in which the seal is porous.

16. A method as claimed in claim 15 in which the seal is a sponge.

17. A method as claimed in claim 15 in which a sealant is applied in liquid form to the seal so that the liquid permeates the pores of the seal before the seal is fed into the host pipe and the sealant sets after a time which allows the sealant to be fed into the host pipe, compressed and expanded radially into engagement with the internal wall of the host pipe.

18. A method as claimed in claim 13 in which the seal is compressed between two stop means mounted on the tubular element.

19. A method as claimed in claim 18 in which a first of the stop means is located closer to the leading end of the liner pipe than a second of the stop means, and in which the second of the stop means is slidably mounted on the tubular element and moves with the liner pipe in the direction of feeding of the liner pipe during lie feeding step but grips the internal wall of the host pipe sufficiently tightly so as to remain stationary during the rearward movement of the liner pipe when the liner pipe is retracted so that the seal is compressed between the two stop means.

20. A method as claimed in claim 18 in which the first stop means is a nose-cone attached to the tubular element.

21. A method as claimed in claim 18 in which the second stop means is a resilient annular stopper.

22. A method as claimed in claim 18 in which the tubular element is provided with a third stop means located further from the leading end of the liner pipe than the second stop means to engage the second stop means so as to ensure forward movement of the second stop means with the liner pipe during the feeding step.

23. A method as claimed in claim 18 in which the tubular element is provided with a further annular member slidably mounted on the tubular element between the seal and the second stop means, the member having at least one radially directed flexible fin for engagement with the internal wall of the host pipe.

24. A method as claimed in claim 13 in which the liner pipe has as its leading end a tubular element secured to the liner pipe.

* * * * *